United States Patent
Chun (10) Patent No.: US 7,634,260 B2
(45) Date of Patent: *Dec. 15, 2009

(54) FILE DOWNLOADING APPARATUS AND METHOD FOR MOBILE COMMUNICATION SYSTEM

(75) Inventor: Chang-Bum Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 273 days.

This patent is subject to a terminal disclaimer.

(21) Appl. No.: 11/896,419

(22) Filed: Aug. 31, 2007

(65) Prior Publication Data

US 2007/0298820 A1    Dec. 27, 2007

Related U.S. Application Data

(63) Continuation of application No. 10/465,724, filed on Jun. 20, 2003, now Pat. No. 7,289,817.

(30) Foreign Application Priority Data

Jun. 20, 2002    (KR) ............................... 2002-34472

(51) Int. Cl.
*H04M 3/00* (2006.01)
(52) U.S. Cl. ...................................... 455/418; 455/419
(58) Field of Classification Search ................. 455/418, 455/419
See application file for complete search history.

(56) References Cited

U.S. PATENT DOCUMENTS

| | | |
|---|---|---|
| 6,178,330 B1 | 1/2001 | Alberty et al. |
| 6,549,770 B1 * | 4/2003 | Marran ........................ 455/419 |
| 7,249,156 B2 * | 7/2007 | Chae ........................... 709/203 |
| 2002/0162112 A1 | 10/2002 | Javed |
| 2003/0105869 A1 | 6/2003 | Matsui et al. |
| 2004/0107237 A1 | 6/2004 | Kashiwada |
| 2004/0148228 A1 | 7/2004 | Kwei |

* cited by examiner

*Primary Examiner*—Creighton Smith
(74) *Attorney, Agent, or Firm*—Birch, Stewart, Kolasch & Birch, LLP (57) ABSTRACT

A mobile terminal and method for controlling downloading of data re discussed. According to an embodiment, the mobile terminal includes a signal processor to process a received signal; a download status checker to check a download status of the data, and to generate download status information of the data based on the checked download status; at least one storage unit to store data outputted from the signal processor, and to store the download status information outputted by the download status checker; and a controller to control the signal processor and the download status checker.

20 Claims, 7 Drawing Sheets

FILE DOWNLOADING APPARATUS AND METHOD FOR MOBILE COMMUNICATION SYSTEM

The present application is a Continuation of application Ser. No. 10/465,724 filed on Jun. 20, 2003 now U.S. Pat. No. 7,289,817 (now allowed), and also claims, under 35 U.S.C. § 119, the foreign priority benefit of Korean Patent Application No. 34472/2002 filed on Jun. 20, 2002. The entire contents of each of these applications are herein incorporated by reference.

BACKGROUND OF THE INVENTION

1. Field of the Invention

The present invention relates to a radio communication system and, in particular, to a file downloading apparatus and method for a mobile terminal, which are capable of downloading files from a certain server on a public network.

2. Description of the Related Art

As technologies advance quickly in the radio communication field, the development of contents applicable to the radio communication environment will give new opportunities to computer game businesses. Among them, a business for providing digital contents to mobile terminals such as cellular phones stands out as one of the most promising fields. Accessing the contents web sites using mobile terminals is rapidly increasing.

Due to the commercialization of the IMT-200 represented by a third generation mobile communication system, it is possible to download a large data file containing data such as music, movie, game, etc. to a mobile terminal and use it.

In a general mobile communication system supporting the file download operations, when a subscriber wants to download a file from a certain site on the Internet, a mobile terminal transmits an Internet connection request signal including an IP address of a contents server to a base station system (BTS). The BTS then establishes a connection between the mobile terminal and the contents server on the Internet through a gateway using the information in the Internet connection request signal. When the connection to the contents server is established, the mobile terminal can download a specific file through keypad manipulation.

However, in the conventional mobile communication system, if the mobile terminal gets away from the BTS or if other mobile terminals simultaneously access the BTS while the current mobile terminal is connected to the contents server and downloading a file, then a data transmission rate is lowered, resulting in the increase of a download time and cost.

Furthermore, when the mobile terminal retries to download the file which is not completely downloaded because the download connection is unwontedly released, the conventional file downloading method has another drawback in that the mobile terminal must re-download the entire file again even though a portion of the associated file has already been downloaded during the previous interrupted connection. The undesired interruption of the download connection can occur due to the mobile terminal entering a radio shadow area, the battery being empty, the voice call reception during the download session, or some other reasons.

SUMMARY OF THE INVENTION

The present invention has been made in an effort to solve the above and other problems associated with the related art.

It is an object of the present invention to provide a file downloading apparatus and method for a mobile communication system capable of reducing a file downloading time and thereby communication cost by resuming the downloading of the same file from a point where the data transfer link has been broken in the middle of the previous download session for the file.

In one aspect of the present invention, the file downloading apparatus of a mobile terminal in a communication system which supports a file download service, comprises: a signal processing unit which processes a signal received through an antenna of the mobile terminal; a memory which stores data outputted from the signal processing unit; a download status checker which checks download status of a file by monitoring the data stored in the memory; and a CPU which controls the signal processing unit and the download status checker.

In another aspect of the present invention, the file downloading method for a mobile terminal in a communication system which supports a file download service, comprises: (a) determining whether or not a file download signal is inputted; (b) establishing a data transfer link with a contents server when the download signal is inputted; (c) downloading a target file; (d) determining whether or not the file is completely finished; (e) determining whether or not a download suspension signal is inputted when the download is not finished; (f) storing data of the target file downloaded up to the input of the download suspension signal as a temporary file when the download suspension signal is inputted; and (g) terminating the downloading of the target file and returning to step (a).

In another aspect of the present invention, a mobile terminal for controlling downloading of data, comprises at least one storage unit to store data received by the mobile terminal; an input unit to receive a download termination signal or a download suspension signal from a user; and a controller to download data through a communication link, and to suspend or terminate the downloading of the data in response to the received download termination or suspension signal.

In another aspect of the present invention, a mobile terminal for controlling downloading of data, comprises at least one storage unit to store data received by the mobile terminal; a receiver to receive a download termination signal or a download suspension signal from a network server; and a controller to download data through a communication link, and to suspend or terminate the downloading of the data in response to the received download termination or suspension signal.

In another aspect of the present invention, a mobile terminal for controlling downloading of data, comprises at least one storage unit to store data received by the mobile terminal; an input unit to receive a download resumption signal from a user; and a controller to resume downloading of data that has been suspended in response to the received download resumption signal.

In another aspect of the present invention, a mobile terminal for downloading data, comprises a signal processor to process a received signal; a download status checker to check a download status of the data, and to generate download status information of the data based on the checked download status; at least one storage unit to store data outputted from the signal processor, and to store the download status information outputted by the download status checker; and a controller to control the signal processor and the download status checker.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Preferred embodiments of the present invention will be described hereinafter with reference to the accompanying drawings.

Figure 1:
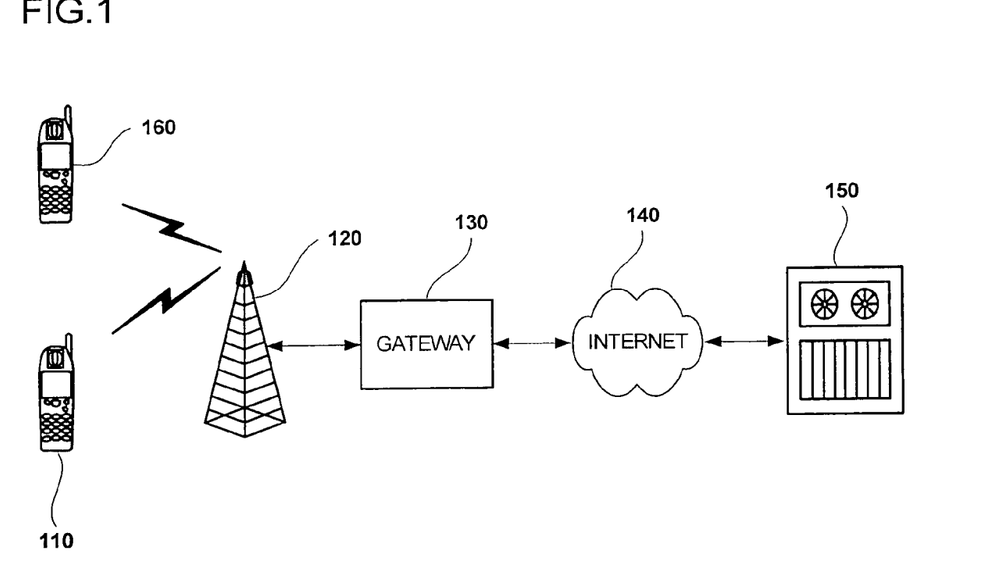
FIG. 1 is a schematic view illustrating a mobile communication system supporting a file download according to the present invention.

FIG. 1 is a schematic view illustrating a mobile communication system supporting file download operations according to an embodiment of the present invention.

As depicted in FIG. 1, when a user desires to download a file from a certain site on the Internet or some other network such as extranet, intranet, etc., a mobile terminal 110 (160) transmits an Internet/network connection request signal which generally includes an IP address of a contents server 150, to a base station system (BTS) 120. As a result, the BTS 120 establishes a connection between the mobile terminal 110 and the contents server 150 over the Internet 140 through a gateway 130 using the information in the Internet connection request signal. The process of establishing the connection between the mobile terminal and the BTS is performed according to known techniques. When the connection to the contents server 150 is established, the mobile terminal 110 can download a specific file or data group through keypad or input device manipulation.

Figure 2:
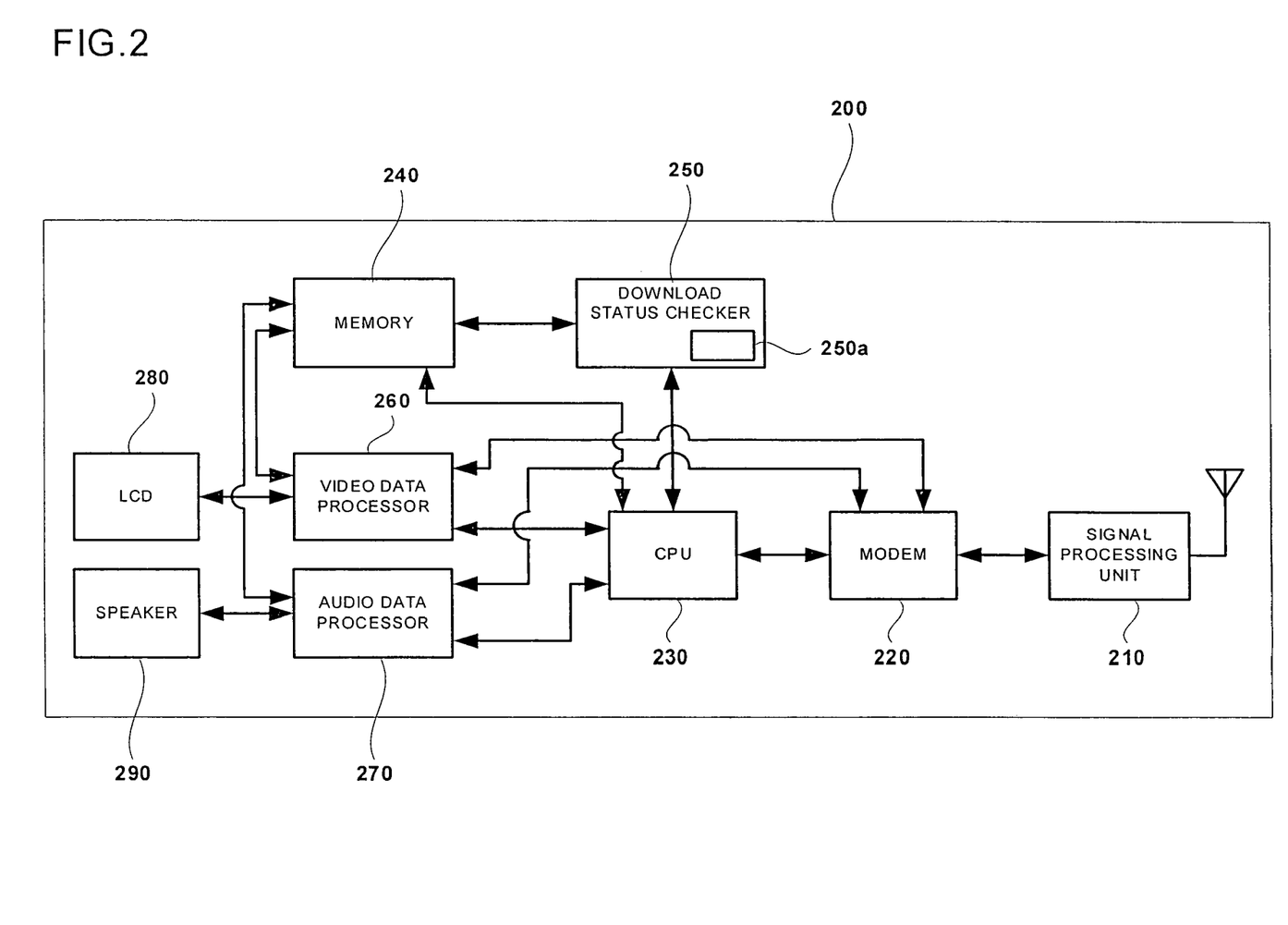
FIG. 2 is a block diagram illustrating a file downloading apparatus of a mobile terminal in accordance with an embodiment of the present invention.

FIG. 2 is a block diagram illustrating a file downloading apparatus 200 of a mobile terminal according to an embodiment of the present invention. The file downloading apparatus 200 can be implemented in the mobile terminal 110,160 of FIG. 1 or other suitable devices.

As depicted in FIG. 2, the file downloading apparatus 200 includes a signal processing unit 210 for processing a signal received through an antenna or other means; a modem 220 for demodulating the signal processed in the signal processing unit 210; a storage or memory 240 for storing data including demodulated data, downloaded files (partial or complete), download status information, etc.; a download status checker 250 for checking the status of the data stored in the memory 240 and storing in a storage 250a and/or the memory 240 the downloaded status information; a video data processor 260 and an audio data processor 270 for processing video and audio data from the modem 220 or the memory 240, respectively; a display 280 for displaying a motion picture or video signal processed in the video data processor 260; a speaker 290 for outputting audibly the audio signal output from the audio data processor 270; and a CPU 230 for controlling the above-mentioned elements. All the components of the file downloading apparatus 200 are operatively coupled. In this example, the display 280 is a liquid crystal display (LCD), but can be any other type of display device.

While downloading a file from the contents server 150 (FIG. 1), the download status checker 250 of the mobile terminal periodically checks and updates status information (e.g., a data amount of the associated file which is accumulated in the memory 240, a next expected byte offset, and the like), and stores in the memory 240 and/or in its own storage 250a the status information updated just before the data transfer line of the associated download session is broken. The status information is transmitted to the contents server 150 over the Internet 140 when there is a download request on the same file, such that the file download is resumed where the data transfer link has been broken. In the preferred embodiment of the present invention, the file downloading method will be exemplary explained with the byte offset as the status information.

The operation of the above-structured file downloading apparatus of the mobile terminal will be described hereinafter.

Figure 3:
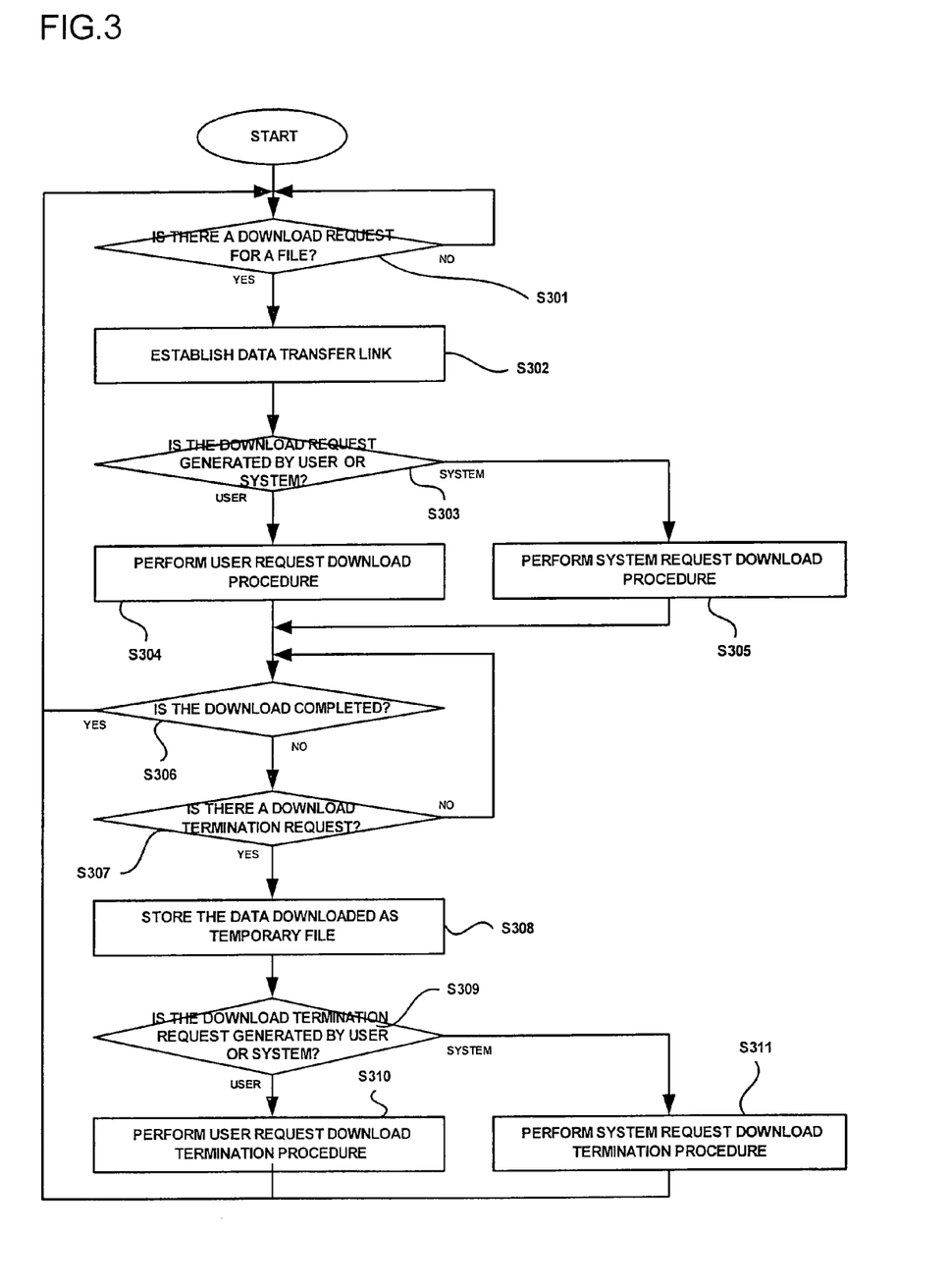
FIG. 3 is a flowchart illustrating a file downloading method of a mobile terminal in accordance with an embodiment of the present invention.

FIG. 3 is a flowchart illustrating a file downloading method of the mobile terminal according to an embodiment of the present invention. This method can be implemented using the apparatus 200 of FIG. 2 and the system of FIG. 1, but can be implemented in other apparatuses and/or systems.

As depicted in FIG. 3, after the mobile terminal is connected with a contents server 150 on the Internet or any other network, the CPU 230 of the file downloading apparatus 200 periodically checks whether or not there is a file download signal as shown at step S301. If a file download signal is inputted by a user or system, the CPU 230 establishes a data transfer link with the contents server 150 which has a requested file at step S302, and determines whether the file download signal is a user request file download signal generated by the user or a system request file download signal generated by the system at step S303. The CPU 230 performs a user request file download procedure at step S304 when the file download signal is a user request file download signal or performs a system request file download procedure at step S305 when the file download signal is a system request file download signal. The user and system file download procedures will be explained in detail later.

While downloading the file in the user or system request file download procedure, the CPU 230 periodically checks whether or not the file download has been completed at step S306 and the process returns to step S301 when the file download has been successfully completed. On the other hand, if the file download is not completed, the CPU 230 determines whether or not a download termination signal is inputted at step S307. The download termination signal can be inputted by the user or the system, and is a command to terminate the download process.

When there is the download termination signal, the CPU 230 stores the data downloaded up to now as a temporary file in the memory 240 or in its storage at step S308 and determines whether the download termination signal is a user request download termination signal or a system request download termination signal at step S309. The CPU 230 performs a user request download termination procedure at step S310 when the download termination signal is a user request download termination signal and performs a system request download termination procedure at step S311 when the download termination signal is a system request download suspension signal. When the user request download termination procedure or the system request download termination procedure is finished, the algorithm of the CPU 230 returns to step S301. In the present invention, the download termination can be a temporary download termination (suspension), or a permanent download termination (cancellation).

At step S303, the entrance into the user request download procedure of step S304 is triggered when the user firstly tries to download the file or retries to download the file after the download is suspended by the user for voice communication or by the system because of aggravation of the communication environments. The download suspension/cancellation by the user is performed according to the user request download termination procedure at step S310. On the other hand, the entrance into the system request download procedure is triggered by the system when the mobile terminal moves into a radio shadow area, a communication with the BTS 120 is broken due to a battery discharge or some other reason, or a data transfer link between the mobile terminal and the contents server 150 is cut off by problems such as traffic congestion on the Internet 140, a trouble at the contents server 150, etc. That is, in accordance with one embodiment of the present invention, the system request download procedure is triggered if there is an incomplete downloading of a file due to some system/device/environment errors or failures. The download termination by the system is performed according to the system request download termination procedure at step S311.

Figure 4:
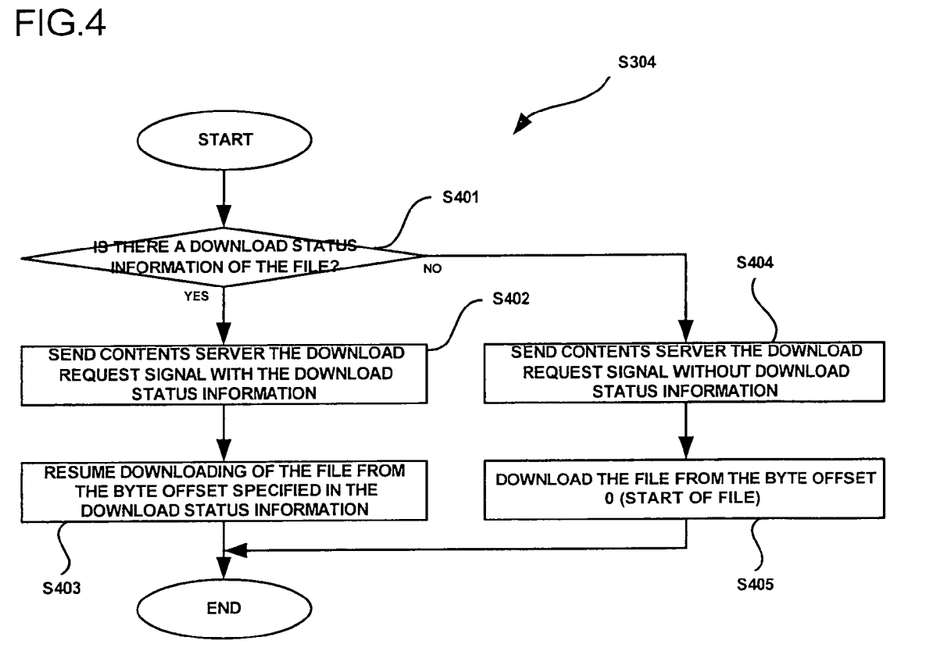
FIG. 4 is a flowchart illustrating a user-request download procedure in FIG. 3 in accordance with an embodiment of the present invention.

FIG. 4 is a flow chart illustrating the user request download procedure (S304) in FIG. 3 according to an embodiment of the present invention.

As depicted in FIG. 4, when the file downloading apparatus 200 starts the user request download procedure, the CPU 230 of the mobile terminal determines whether or not the download status information of a requested file exists in the download status checker 250 at step S401. The download status checker 250 may obtain the download status information from the memory 240 or from its own storage 250a. In this embodiment, the presence of the download status information of a file implies that the download of that file has not been completed. The absence of the download status information implies that the download of the file is completed. If the download status information of the requested file exists indicating incomplete downloading, the CPU 230 transmits this download status information and a download request signal to the contents server 150 (e.g., via the Internet 140 or other network) at step S402 and resumes the downloading of the file from the point at which the download was stopped in the previous download session at step S403. The download status information identifies to the contents server 150 the point in the file from which the download should be resumed. In the meantime, when the download status information about the requested file does not exist in the download status checker 250, the CPU 230 transmits the download request signal to the contents server 150 without the download status information as shown at step S404 so as to download the file from the start of the file, e.g., the byte offset 0, at step S405.

Figure 5:
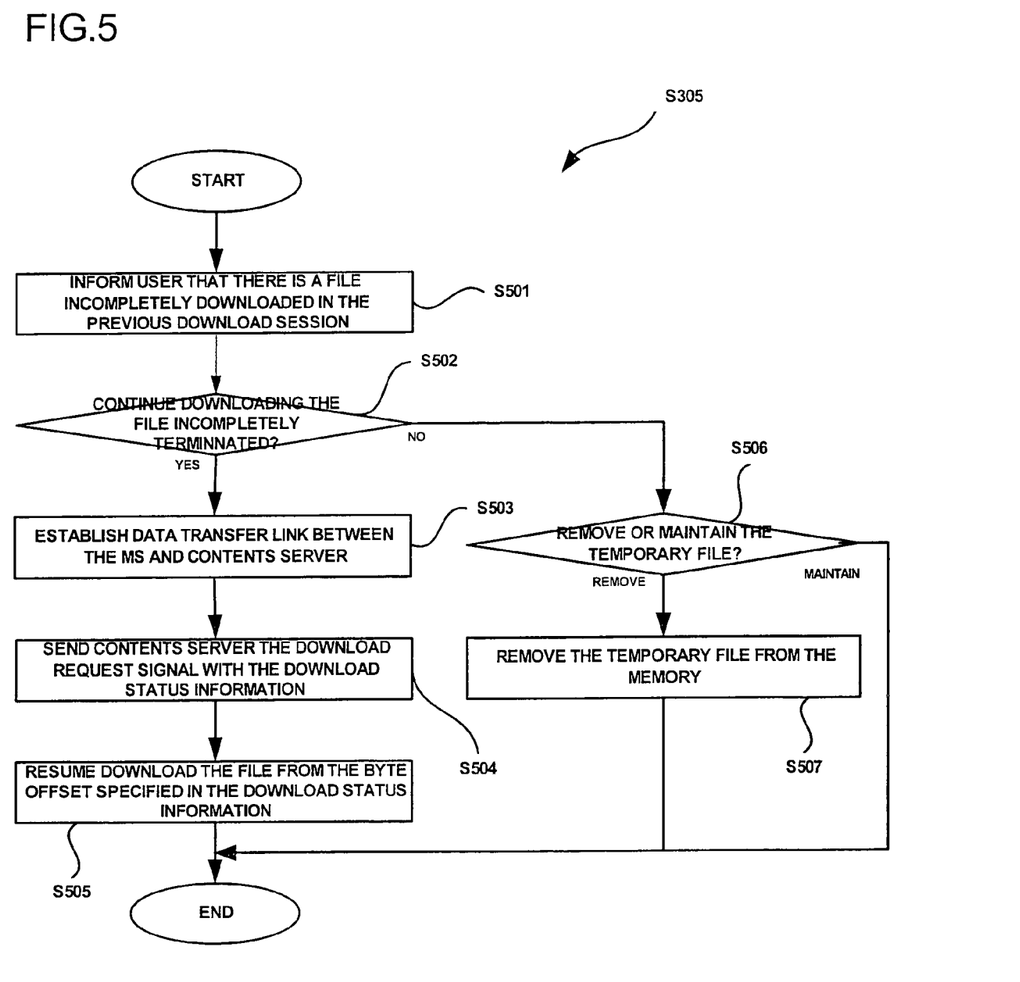
FIG. 5 is a flowchart illustrating a system-request download procedure in FIG. 3 in accordance with an embodiment of the present invention.

FIG. 5 is a flow chart illustrating the system request download procedure (S305) in FIG. 3 according to an embodiment of the present invention.

As depicted in FIG. 5, when the file downloading apparatus 200 starts the system request download procedure which in this example implies an incomplete downloading, the CPU 230 of the mobile terminal displays a download suspension reason to the user through the display 280 or/and the speaker 290 at step S501 and asks the user if the user wishes to resume the downloading of the file at step S502. If the user inputs a download resumption signal by keypad manipulation or some other means, the CPU 230 establishes a data transfer link between the mobile terminal and the contents server 150 at step S503 and transmits a download request signal to the contents server 150 with the download status information at step S504. Accordingly, the file download is resumed from the point at which the download was stopped in the previous file transfer session, based on the download status information, e.g., from the next expected byte offset contained in the download status information, at step S505.

At step S502, if the user does not wish to resume downloading (e.g., if a download cancel signal is inputted by the user), the CPU 230 asks the user if he or she wants to delete the temporary file stored during the previous download session or maintain the temporary file in the memory 240 in order to resume download of the file later at step S506. As such, the temporary file containing the portion of the file downloaded so far is deleted at step S507 when a file delete signal is inputted, or the temporary file is maintained in the memory 240 based on the user's request.

Figure 6:
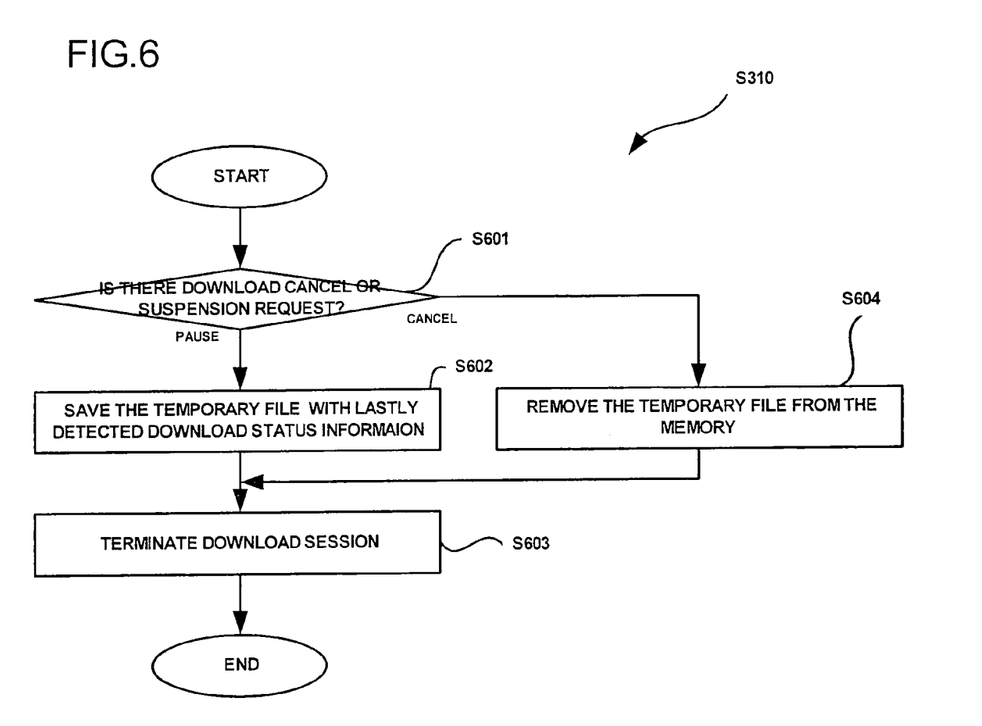
FIG. 6 is a flowchart illustrating a user request-download termination procedure in FIG. 3 in accordance with an embodiment of the present invention.

FIG. 6 is a flowchart illustrating the user request download termination procedure (S310) in FIG. 3 according to an embodiment of the present invention.

As depicted in FIG. 6, the CPU 230 of the mobile terminal checks whether there is a download suspension signal or a download cancel signal. When the download suspension signal is inputted at step S601, the CPU 230 stores in the memory 240 or other storage the temporary file with the download status information lastly detected by the download status checker 250 at step S602 and terminates the current download session at step S603.

On the other hand, at step S601 if the download cancel signal is inputted, the CPU 230 deletes the temporary file associated with the requested file at step S604 and terminates the current file download session as shown at step S603.

The file download can be suspended by the user when a data transfer rate is sharply lowered due to the radio environment deterioration such as sudden increase of the number of mobile terminals accessing the pertinent BTS or when the user terminates the file download session for voice communication.

Figure 7:
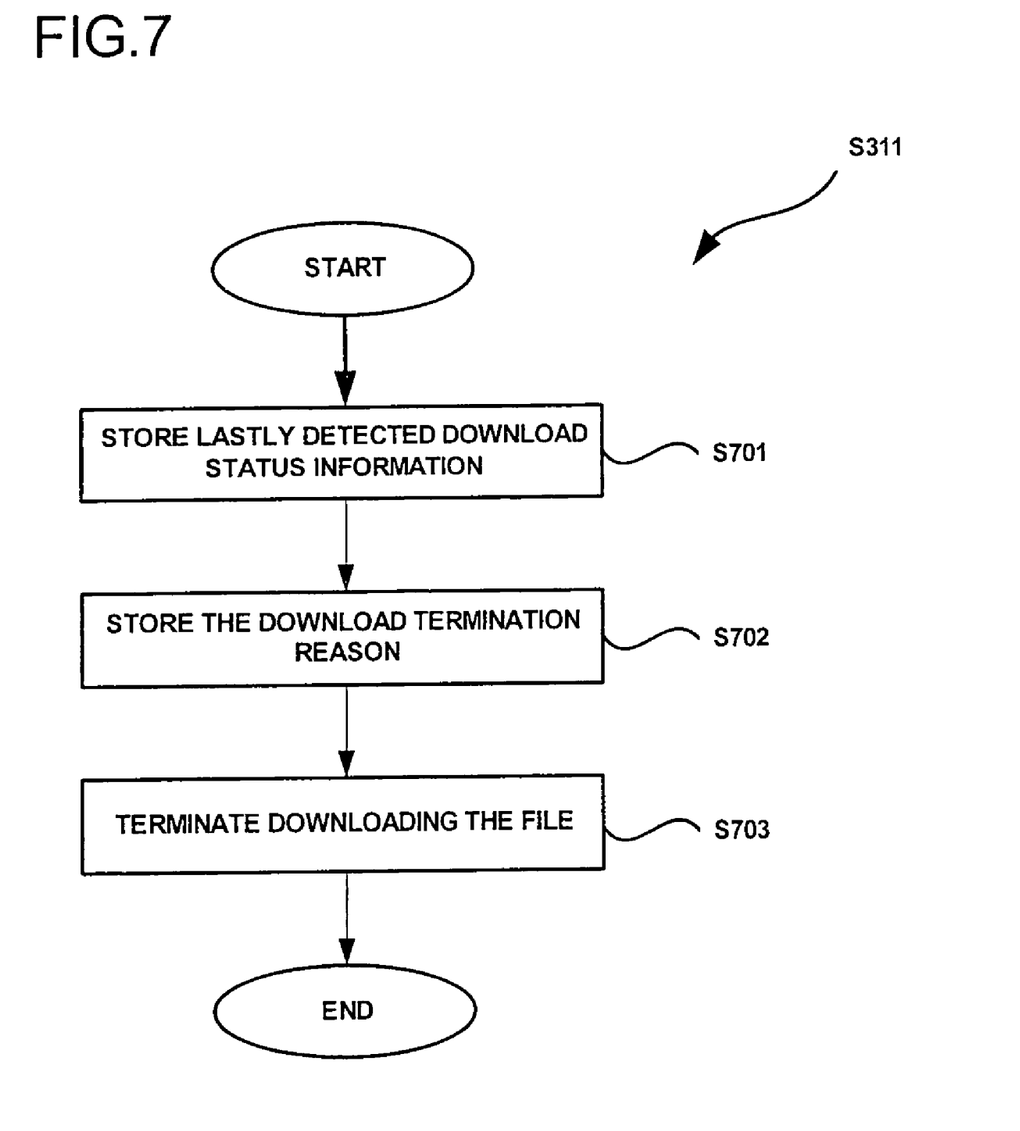
FIG. 7 is a flowchart illustrating a system request-download termination procedure in FIG. 3 in accordance with an embodiment of the present invention.

FIG. 7 is a flowchart illustrating the system request download termination procedure (S311) in FIG. 3 according to an embodiment of the present invention.

As depicted in FIG. 7, the CPU 230 of the mobile terminal stores in the memory 240 or some other storage the temporary file with the download status information lastly detected by the download status checker 250 and the download termination reason at steps S701 and S702. As discussed above, the temporary file contains a portion of the requested file downloaded so far. Then the CPU 230 terminates the current file download session at step S703. Optionally, before or during this download termination process, the system informs the user of the download termination reason using the display 280 and/or speaker or some other means.

The system request download termination signal can be generated when the mobile terminal 110 moves into a radio shadow area, a communication with the BTS 120 is cut off due to the battery discharge or some other reason, a data transfer link between the mobile terminal 110 and the contents server 150 is cut off by the system request due to problems such as traffic congestion on the Internet 140 and breakdown of the contents server 150, or due to some other reason. In that case, the system informs the user of the download termination reason such as "Download is suspended/terminated because the mobile terminal enters into a non-service available area", "Download is suspended/terminated because the battery is empty", etc. on the display 280 or/and via the speaker 290, stores the download suspension reason and the download status information, and simultaneously stores the data downloaded up to when the download is suspended.

In accordance with one embodiment of the present invention, the user request download termination and the download retry procedure can be performed by selecting a certain item among items displayed on the display 280 by a keypad manipulation or some other means on the display 280 and/or via voice-activated commands.

In addition, the file download procedure and the file download termination procedure can be performed individually for plural files. Accordingly, it is possible to start downloading one file after suspending/cancelling a download of another file which is downloaded through a different file transfer link. Also, it is possible to delete or resume downloading a specific file according to the user's instructions. It is also possible to perform by one or more mobile terminals the multiple file download/termination procedures simultaneously in parallel for multiple files using different file transfer links.

In accordance with an embodiment of the present invention, the download status information includes a next expected byte offset of a requested file, a data amount of the file downloaded up to that point, an IP address information of the associated contents server, a location of the file in the contents server, etc.

In accordance with an embodiment of the present invention, the user request download and user request download termination procedures are performed through a forward link traffic channel between the mobile terminal and the BTS. In other words, when there is a download request or download termination request by the user, the mobile terminal sends the download request or download termination request signals to the BTS system using information bits of forward link, which includes the download status information, and the BTS system establishes or terminates a data transfer link with the contents server according to the download request or the download suspension request signal.

On the other hand, in accordance with an embodiment of the present invention, the system request download and system request download termination procedures are performed through a reverse link traffic channel between the mobile terminal and the BTS. That is, when the transfer rate significantly decreases because the mobile terminal enters a radio shadow area or the transmission power becomes weak due to the battery consumption or the transfer link is broken due to problems such as traffic congestion and breakdown of the contents server, the BTS system informs the mobile terminal that the download transfer session is suspended or cancelled, using information bit(s) of the reverse link traffic channel. If the mobile terminal is out of the radio shadow area, the battery is charged, or the traffic congestion or breakout of the contents server is solved such that the download of the desired file can be resumed, the BTS system informs the mobile terminal that it is possible to download the file. In this case the mobile terminal reports to the user that the download can be resumed through the display or/and the speaker and ask the user to resume or cancel the download of the file. If the download request signal for the file suspended in the previous download session is inputted by the user, the mobile terminal establishes a new data transfer channel with the contents server and resumes the download of the file.

The features of the embodiments of the present invention can be combined or substituted with each other to provide variations of the present invention, which are contemplated to be part of the present invention.

The present invention is not limited to downloading files, but is applicable to downloading any other forms of data and information. Also, the present invention is not limited to the use of a mobile terminal over the Internet, but is equally applicable to the user of other types of communication devices using communication techniques.

The processing steps of the present invention can be implemented using any known computer programming language.

As described above, in the file downloading apparatus and method for the mobile terminal of the present invention, it is possible to resume or cancel the downloading of the file which is stopped during a previous download session.

Also, even though the data transfer link is broken during the download of the file due to unexpected network problems, it is possible to resume downloading the file from the point at which the download was stopped in the previous data transfer session, thereby reducing the downloading time and cost significantly.

Furthermore, the present invention minimizes the burden for searching the same file again and thereby reduces the time and communication cost for downloading the file.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile terminal for controlling downloading of data, comprising:
    at least one storage unit to store data received by the mobile terminal;
    an input unit to receive a download termination signal or a download suspension signal from a user; and
    a controller to download data through a communication link, and to suspend or terminate the downloading of the data in response to the received download termination or suspension signal.

2. The mobile terminal of claim 1, wherein when the download suspension signal is received, the at least one storage unit suspends the downloading and stores the data downloaded so far and latest download status information.

3. The mobile terminal of claim 2, wherein the latest download status information indicates a point at which the downloading was suspended.

4. The mobile terminal of claim 3, wherein the controller resumes the downloading of the data based on the stored latest download status information when a next downloading session is performed.

5. The mobile terminal of claim 1, wherein when the download terminal signal is received, the controller deletes the data downloaded so far and terminates the downloading.

6. A mobile terminal for controlling downloading of data, comprising:
    at least one storage unit to store data received by the mobile terminal;

a receiver to receive a download termination signal or a download suspension signal from a network server; and a controller to download data through a communication link, and to suspend or terminate the downloading of the data in response to the received download termination or suspension signal.

7. The mobile terminal of claim 6, wherein when the download suspension signal is received, the at least one storage unit suspends the downloading and stores the data downloaded so far and latest download status information.

8. The mobile terminal of claim 7, wherein the latest download status information indicates a point at which the downloading was suspended.

9. The mobile terminal of claim 8, wherein the controller resumes the downloading of the data based on the stored latest download status information when a next downloading session is performed.

10. The mobile terminal of claim 6, wherein when the download termination signal is received, the controller deletes the data downloaded so far and terminates the downloading.

11. The mobile terminal of claim 6, wherein the controller receives reasons for terminating or suspending the downloading of the data from the network server, and informs a user of the reasons.

12. A mobile terminal for controlling downloading of data, comprising:
at least one storage unit to store data received by the mobile terminal;
an input unit to receive a download resumption signal from a user; and
a controller to resume downloading of data that has been suspended in response to the received download resumption signal.

13. The mobile terminal of claim 12, wherein the at least one storage unit stores latest download status information indicating a point at which the downloading of the data has been suspended.

14. The mobile terminal of claim 13, wherein the controller resumes the downloading of the data based on the latest download status information.

15. The mobile terminal of claim 14, wherein the controller resumes the downloading of the data based on a byte offset specified in the latest download status information.

16. A mobile terminal for downloading data, comprising:
a signal processor to process a received signal;
a download status checker to check a download status of the data, and to generate download status information of the data based on the checked download status;
at least one storage unit to store data outputted from the signal processor, and to store the download status information outputted by the download status checker; and
a controller to control the signal processor and the download status checker.

17. The mobile terminal of claim 16, wherein the data outputted from the signal processor and the download status information are stored in one same storage unit.

18. The mobile terminal of claim 16, wherein the data outputted from the signal processor and the download status information are stored in separate storage units.

19. The mobile terminal of claim 16, wherein the at least one storage unit includes a memory.

20. The mobile terminal of claim 16, wherein the download status information indicates a point at which latest downloading of data has been suspended.

* * * * *